(12) United States Patent
Brown

(10) Patent No.: US 7,009,789 B1
(45) Date of Patent: Mar. 7, 2006

(54) OPTICAL DEVICE, SYSTEM AND METHOD

(75) Inventor: David R. Brown, Meridianville, AL (US)

(73) Assignee: Mems Optical, Inc., Huntsville, AL (US)

( * ) Notice: Subject to any disclaimer, the term of this patent is extended or adjusted under 35 U.S.C. 154(b) by 0 days.

(21) Appl. No.: 09/507,466

(22) Filed: Feb. 22, 2000

(51) Int. Cl.
G02B 27/00 (2006.01)
G02B 5/04 (2006.01)

(52) U.S. Cl. .................. 359/900; 359/613; 359/831
(58) Field of Classification Search ............ 359/599, 359/707, 558–576, 742, 831–837, 900, 454–459, 359/601–614; 349/56–64; 362/34
See application file for complete search history.

(56) References Cited

U.S. PATENT DOCUMENTS

| 3,754,814 | A | * | 8/1973 | Leith | 359/599 |
|---|---|---|---|---|---|
| 3,797,915 | A | | 3/1974 | Land et al. | 359/742 |
| 3,988,609 | A | * | 10/1976 | Lewin | 362/31 |
| 4,204,881 | A | | 5/1980 | McGrew | 136/246 |
| 4,787,722 | A | | 11/1988 | Claytor | 359/742 |
| 4,900,129 | A | | 2/1990 | Vanderwerf | 359/742 |
| 4,936,666 | A | | 6/1990 | Futhey | 359/573 |
| 4,946,252 | A | * | 8/1990 | Sugawara | 359/619 |
| 5,198,922 | A | * | 3/1993 | Chahroudi | 359/290 |
| 5,247,390 | A | * | 9/1993 | Hed | 359/599 |
| 5,339,179 | A | * | 8/1994 | Rudisill et al. | 349/64 |
| 5,410,006 | A | | 4/1995 | Tachibana et al. | 359/742 |
| 5,497,269 | A | | 3/1996 | Gal | 359/615 |
| 5,551,042 | A | | 8/1996 | Lea et al. | 359/742 |
| RE35,534 | E | | 6/1997 | Claytor | 359/742 |
| 5,751,478 | A | | 5/1998 | Yoshimura et al. | 359/453 |
| 5,796,521 | A | | 8/1998 | Kahlert et al. | 359/619 |
| 5,861,990 | A | * | 1/1999 | Tedesco | 359/599 |
| 5,969,864 | A | | 10/1999 | Chen et al. | 359/569 |
| 6,002,520 | A | * | 12/1999 | Hoch et al. | 359/565 |
| 6,078,426 | A | * | 6/2000 | Siegfried | 359/599 |
| 6,081,376 | A | * | 6/2000 | Hansen et al. | 359/485 |
| 6,163,405 | A | * | 12/2000 | Chang et al. | 359/599 |
| 6,616,285 | B1 | * | 9/2003 | Milner | 359/613 |

OTHER PUBLICATIONS

English Abstract of Reference JP 11202112.

* cited by examiner

*Primary Examiner*—Thong Q Nguyen
(74) *Attorney, Agent, or Firm*—Olds, Maier, & Richardson, PLLC

(57) ABSTRACT

An optical device is formed of an array of micro-wedges where each micro-wedge is different in size and shape from adjacent micro-wedges. Each micro-wedge of the array directs light in a predetermined direction toward a particular sub-region of an angular pattern. The positions of the micro-wedges in the device may be essentially random with respect to the corresponding positions of the sub-regions. The device causes the output light to fill a large angular spread with homogenized light with clear boundaries and edges. The device employs refraction or reflection, and the device operates efficiently over a broad wavelength band.

7 Claims, 3 Drawing Sheets

FIG. 6
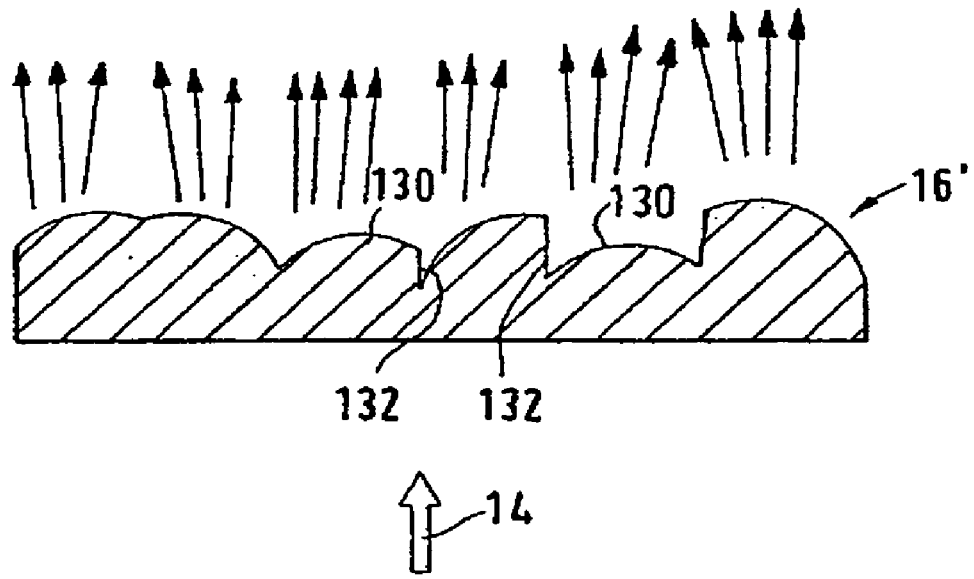
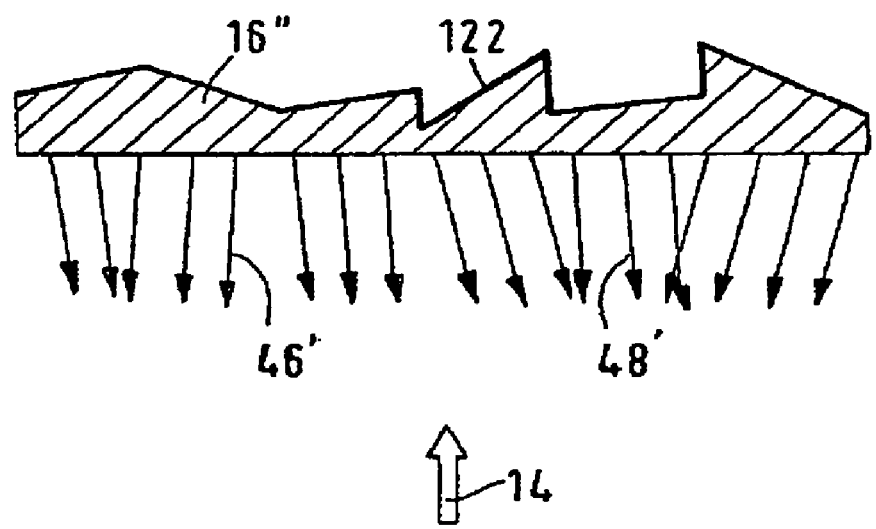
FIG. 7

OPTICAL DEVICE, SYSTEM AND METHOD

FIELD OF THE INVENTION

The present invention relates generally to optics and optical systems and devices. The present invention also relates to a device for forming an homogenized light pattern. The present invention also relates to a method of making an optical device.

BACKGROUND OF THE INVENTION

Known techniques for homogenizing light make use of arrayed micro-lenses, diffractive diffusers, ground glass diffusers, and holographically-generated diffusers. Micro-lens arrays homogenize light by creating an array of overlapping diverging cones of light. Each cone originates from a respective micro-lens and diverges beyond the focal spot of the lens. In the known arrays, the individual lenses are identical to each other. Ground glass diffusers are formed by grinding glass with an abrasive material to generate a light-scattering structure in the glass surface.

Micro-lens arrays, ground glass diffusers and holographic diffusers all have the disadvantage of not being able to control the angular spread of the homogenized, diverging light. Light in general has an angular spread that is fairly uniform over a desired angular region, but the boundaries of the angular region are blurred. With the known diffuser methods, the energy roll-off at the edge of the desired angular spread can extend well beyond this region.

Diffractive diffusers can be used to control the angular spread of the output light, but such diffusers are limited with respect to the amount of spread that they can impart to the output light. Due to fabrication limitations for short wavelength sources, visible or below, and limitations in the physics of the structures for longer wavelengths the maximum angular spread is limited. Further, diffractive diffusers used in their traditional binary form can include a significant amount of background energy and the patterns must be symmetric about the optical axis.

Thus, there is a need for a device which can homogenize light while controlling a broad angular spread of the homogenized, diverging light beam. Additionally, there is a need for a method of making an improved device for homogenizing light.

SUMMARY OF THE INVENTION

The disadvantages of the prior art are overcome to a great extent by the present invention. The present invention relates to an optical device formed of a plurality of optical elements. The elements may be used to direct portions of an incident light beam in predetermined, respective directions. The optical elements may be formed adjacent to each other in a two-dimensional array. Adjacent elements may have different shapes. The locations of the elements in the array may be essentially random with respect to the directions of the corresponding light beam portions.

According to preferred embodiments of the invention, the optical elements may be formed of transparent or reflective materials. The output surfaces of the respective elements may be flat and planar or they may be curved and non-planar.

According to another aspect of the invention, the optical device may be used to form an angular pattern. Alternatively, the device may be used to split the incoming beam into sub-beams.

The present invention also relates to an optical system that has a light source and an optical homogenizing device. The optical device may be formed of a large number of micro-wedges. The wedges may be used to form respective non-adjacent portions of a desired angular pattern. In a preferred embodiment of the invention, adjacent wedges may be formed with different three-dimensional configurations.

The present invention also relates to a method of making a multi-faceted optical device. The method includes the steps of (1) dividing an angular pattern into sub-angular regions, (2) determining micro-wedge configurations for directing beam portions to the sub-angular regions, and (3) generating an array of micro-wedges according to the determined configurations, such that adjacent wedges have different configurations.

According to another aspect of the invention, the two-dimensional arrangement or ordering of the wedges in the device array is essentially random with respect to the two-dimensional arrangement of the sub-angular regions in the pattern. According to this aspect of the invention, the respective micro-wedge configurations may be assigned to random locations in the array. Thus, the relative positions or order of the wedges in the array has essentially no relationship to the relative positions or order of the sub-angular regions in the pattern. According to yet another aspect of the invention, the output surface slopes for the micro-wedges are calculated by a programmed general-purpose computer based on the locations of the respective sub-angular regions in the desired pattern.

In a preferred embodiment of the invention, appropriate phase tare surfaces may be used to divide the output surfaces of the micro-wedges into stepped or terraced surfaces, to thereby reduce the overall thickness of the optical device.

According to yet another aspect of the invention, an optical homogenizing device is formed of a tiled array of sub-devices, where each sub-device has randomly arranged micro-wedges. The tiled device may be used, for example, to handle large diameter input beams.

Thus, the present invention provides a method and apparatus for homogenizing a beam of light. The invention makes use of micro-structures in an array where each optical element or micro-wedge is different from its adjacent neighbor in size and slope. The array of different micro-wedges can homogenize light sources without the disadvantages of the prior art. Various combinations and alterations to the micro-wedge array may include: adding a phase bias to the micro-wedges to further scramble the incoming beam; and adding a lens function to the surface of the array or to the back surface of the device.

The present invention may be used to homogenize light sources, perform beam splitting operations, and/or to redirect light in a given direction.

These and other advantages and features of the invention will become apparent from the following detailed description of the invention which is provided in conjunction with the accompanying drawings.

BRIEF DESCRIPTION OF THE DRAWINGS

FIG. 6 is a partial cross sectional view of yet another optical device constructed in accordance with the present invention.

FIG. 7 is a partial cross sectional view of yet another optical device constructed in accordance with the present invention.

DETAILED DESCRIPTION OF PREFERRED EMBODIMENTS

Figure 1:
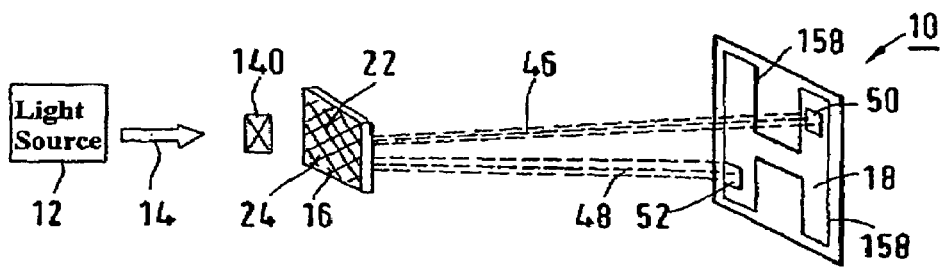
FIG. 1 is a schematic perspective view of an optical system constructed in accordance with a preferred embodiment of the invention.

Referring now to the drawings, where like reference numerals designate like elements, there is shown in FIG. 1 an optical system 10 constructed in accordance with a preferred embodiment of the invention. The optical system 10 has a light source 12 for generating a light beam 14, and an optical device 16 for homogenizing the beam 14. In operation, the device 16 may be used to form an angular pattern 18. In the illustrated embodiment, the pattern constitutes the letter "H." In alternative embodiments, the device 16 may be used to form a wide variety of patterns, including for example a split beam pattern.

In a preferred embodiment of the invention, the optical device 16 is formed of an array of optical wedges 22, 24. The wedges 22, 24 receive incident portions of the input beam 14 and direct the beam portions 46, 48 toward respective portions 50, 52 of the angular pattern 18.

Figure 2:
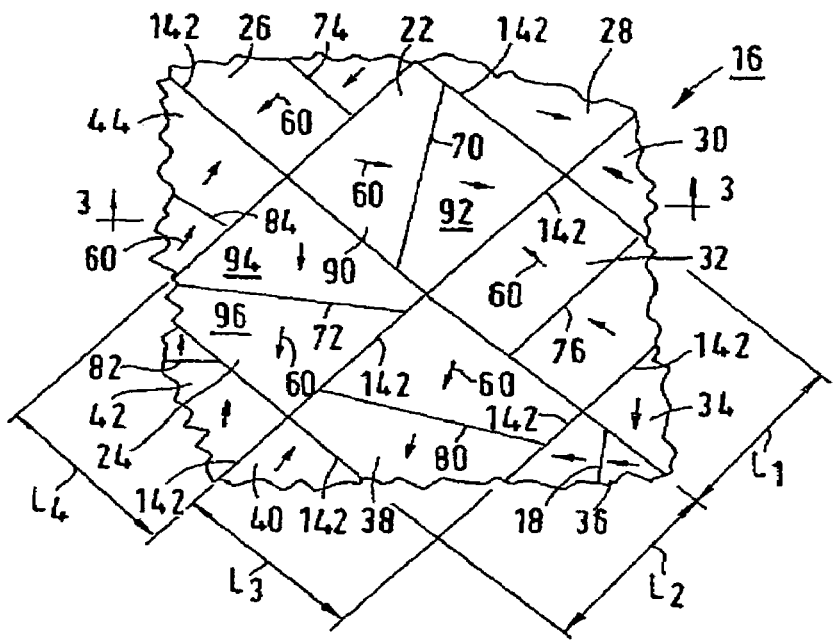
FIG. 2 is a partial plan view of the optical device shown in FIG. 1.
Figure 3:
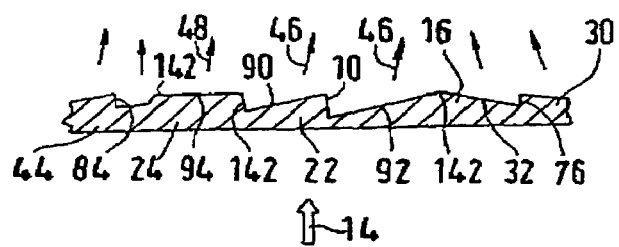
FIG. 3 is a cross sectional view of the optical device of FIG. 2, taken along the line 3—3.

As shown in more detail in FIG. 2, the optical device 16 may be formed of numerous square or rectangular-shaped micro-wedges 22, 24, 26, 28, 30, 32, 34, 36, 38, 40, 42, 44. Although only twelve wedges 22, 24, 26, 28, 30, 32, 34, 36, 38, 40, 42, 44 are shown in FIG. 2, the optical device 16 may have ten thousand or more wedges 22, 24, 26, 28, 30, 32, 34, 36, 38, 40, 42, 44 distributed randomly across its output surface. The configuration (i.e., three-dimensional shape) and slope of each wedge 22, 24, 26, 28, 30, 32, 34, 36, 38, 40, 42, 44 may be different than the configuration and slope of each adjacent wedge 22, 24, 26, 28, 30, 32, 34, 36, 38, 40, 42, 44. In a preferred embodiment of the invention, the wedges 22, 24, 26, 28, 30, 32, 34, 36, 38, 40, 42, 44 have flat, planar optical output surfaces (FIG. 3). The present invention should not be limited, however, to the preferred embodiments shown and described herein in detail.

In a preferred embodiment of the invention, the areas of adjacent wedges 22, 24, 26, 28, 30, 32, 34, 36, 38, 40, 42, 44 are made unequal by selecting the lengths of the edges 142 appropriately. As shown in FIG. 2, for example, the lengths L1 and L2 of edges (or boundaries) 142 extending in a first direction may be made not equal to each other (L1≠L2). Similarly, the lengths L3 and L4 of edges 142 that extend in the orthogonal direction may be made not equal to each other (L3≠L4). By constructing the wedges 22, 24, 26, 28, 30, 32, 34, 36, 38, 40, 42, 44 in different sizes by making their side edges 142 of different lengths, interference effects may be reduced.

The arrows 60 in FIG. 2 represent the direction of increasing thickness for the respective wedges 22, 24, 26, 28, 30, 32, 34, 36, 38, 40, 42, 44 (where thickness is measured in a direction perpendicular to the plane of the page). Thus, the first wedge 22 increases in thickness from left to right in FIG. 2, whereas the second wedge 24 increases in thickness from top to bottom as viewed in FIG. 2. A third wedge 26 increases in thickness in a direction toward the lower left corner of FIG. 2. A fourth wedge 32 increases in thickness in a direction toward the upper left corner of FIG. 2.

Phase tare surfaces 70, 72, 74, 76, 78, 80, 82, 84 may be provided to reduce the overall thickness of the optical device 16. Thus, the first wedge 22 is separated by a tare surface 70 into first and second portions 90, 92. The slopes (60) of the first and second portions 90, 92 may be equal to each other. That is, the planar output surfaces of the first and second portions 90, 92 may be parallel to each other. Likewise, the second wedge 24 is separated by a tare surface 72 into first and second parallel portions 94, 96. The slopes (designated by arrows 60) of the two portions 94, 96 may be equal to each other.

The tare surfaces 70, 72, 74, 76, 78, 80, 82, 84 in effect operate to fold the output surfaces of the micro-wedges 22, 24, 26, 28, 30, 32, 34, 36, 38, 40, 42, 44. The tare surfaces 70, 72, 74, 76, 78, 80, 82, 84 may be especially useful when the slopes (60) of the wedge output surfaces are relatively great. The heights of the tare surfaces 70, 72, 74, 76, 78, 80, 82, 84 (measured in the direction from top to bottom as viewed in FIG. 3) may be a function of the wavelength of the incident light, if desired. For example, the heights of the tare surfaces 70, 72, 74, 76, 78, 80, 82, 84 may be integer multiples of the wavelength of the incoming light beam 14.

As shown in FIG. 3, the phase tare surfaces 70, 72, 74, 76, 78, 80, 82, 84 may lie in planes that are essentially parallel to the propagation direction of the input beam 14. In FIG. 3, the surfaces of the micro-wedges located behind the cross sectional line 3—3 are not shown for the sake of clarity of illustration. In other words, FIG. 3 represents only a thin slice of the optical device 16 taken along line 3—3. The slice illustrates a smooth regularly shaped exterior surface upon which the light beam 14 is incident and an irregularly shaped exterior output surface out of which beam portions 46 and 48 are transmitted.

In operation, the light source 12 transmits the input beam 14 toward the optical device 16. The input beam 14 may have an uneven intensity distribution across its cross section. The beam 14 is directed onto the optical device 16 such that portions of the beam 14 are incident on respective wedges 22, 24, 26, 28, 30, 32, 34, 36, 38, 40, 42, 44. The wedges 22, 24, 26, 28, 30, 32, 34, 36, 38, 40, 42, 44 direct the beam portions 46, 48 in predetermined directions to form an homogenized angular pattern 18. The homogenized pattern 18 may have a substantially uniform light intensity distribution. The beam portions 46, 48 are transmitted in different directions since each wedge 22, 24, 26, 28, 30, 32, 34, 36, 38, 40, 42, 44 is different from its adjacent and neighboring wedges 22, 24, 26, 28, 30, 32, 34, 36, 38, 40, 42, 44 in size and/or slope (60). Thus, the light output 46, 48 of each wedge 22, 24, 26, 28, 30, 32, 34, 36, 38, 40, 42, 44 is directed or angled toward a particular sub-angular region 50, 52 of the desired angular spread 18. Although the angular spread or pattern 18 is shown as the letter "H" in FIG. 1, the optical device 16 also may be used to split the input light beam 14 and/or to form a variety of other patterns.

Figure 4:
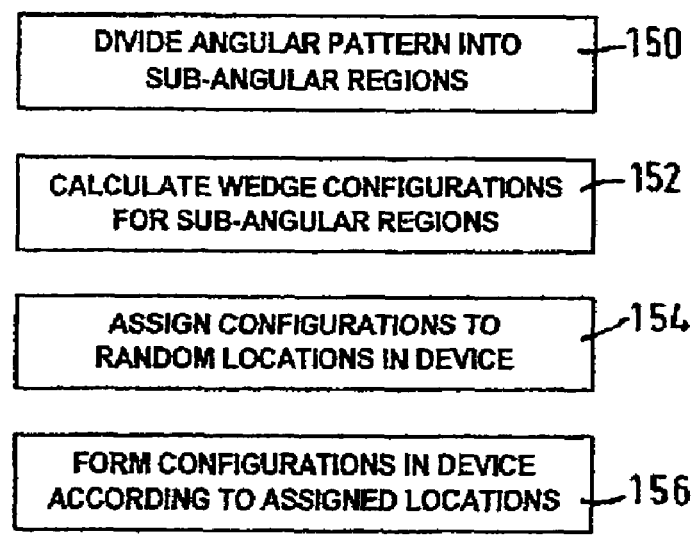
FIG. 4 illustrates a method of making the optical device of FIGS. 2 and 3.

Referring now to FIG. 4, a preferred method of making the optical device 16 includes the step of dividing the desired pattern 18 into small sub-angular regions (Step 150). The size of the incident beam 14 may be used to determine an appropriate number of sub-angular regions into which the pattern 18 should be divided. If the cross sectional area of the beam 14 is relatively large, then a relatively large number of sub-angular regions may be employed. If the cross sectional area of the beam 14 is relatively small, then a relatively small number of sub-angular regions may be employed. Although only two sub-angular regions 50, 52 are shown in FIG. 1 for the sake of clarity, the present invention may be practiced by dividing the entire pattern 18 into ten thousand or more such sub-angular regions. The number of sub-angular regions may be related to the number of wedges to be formed in the optical device 16.

Then, using appropriate geometric calculations, a slope and a three dimensional configuration for each wedge is determined such that the wedge will direct a portion of the input beam to a respective sub-angular region (Step 152). Then, a location within the device 16 is randomly chosen for each calculated wedge configuration (Step 154). The random placement of the wedges 22, 24, 26, 28, 30, 32, 34, 36, 38, 40, 42, 44 in the optical device 16 causes the pattern 18 to have a uniform intensity. In other words, the random location of the wedges 22, 24, 26, 28, 30, 32, 34, 36, 38, 40, 42, 44 causes the input beam 14 to be homogenized.

The output surfaces of the wedges 22, 24, 26, 28, 30, 32, 34, 36, 38, 40, 42, 44 may then be formed in a suitable substrate (e.g., glass) by gray scale photolithography, a suitable direct write method (e.g., electron beam or laser), or by another suitable technique (Step 156).

If the number of sub-angular regions in the pattern 18 is less than the number of micro-wedges desired to be arrayed in the device 16, then some of the wedges may have the same slope and size. The similar wedges will direct light energy to the same location or sub-angular region. However, the wedges with similar slopes, sizes and shapes are preferably not located adjacent one another.

The illustrated optical device 16 may be used to increase the amount of angular spread in the pattern 18 while maintaining a well defined pattern boundary 158 (FIG. 1). For example, at a wavelength of two hundred forty eight nanometers, with efficiencies of from eighty five percent to ninety five percent, depending on the shape of the output pattern 18, a half angle of approximately seven degrees is obtainable.

In addition, the device 16 may be used efficiently over a broad wavelength band, including but not limited to white light. This is an advantage over diffractive diffusers since diffractive diffusers are tuned to a particular wavelength and have decreased efficiency at different wavelengths.

Figure 5:
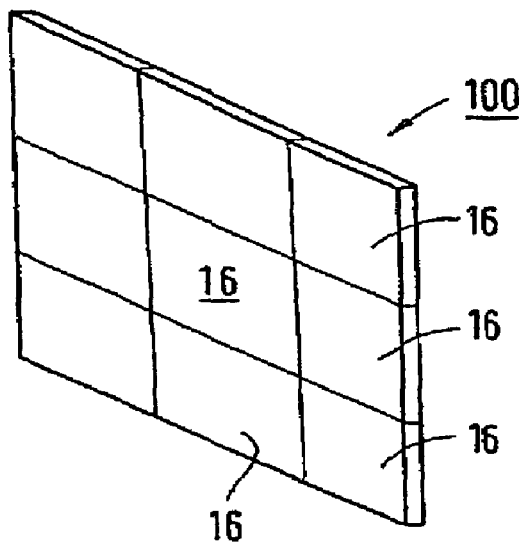
FIG. 5 is a perspective view of another optical device constructed in accordance with the present invention.

According to another embodiment of the invention, an optical device 100 (FIG. 5) may be formed of a tiled array of smaller devices 16. The tiled device 100 may be used, for example, to handle large diameter input beams. The size of each tile 16 may be slightly different from the neighboring tiles 16 to eliminate interference effects that might otherwise be caused by a repeating pattern. The intensity of light transmitted through each tile 16 may be different, which may cause a slight change in the amount of energy imparted to each sub-angular region in the pattern 18. This effect is reduced, however, by the random placement of wedges within each tile 16.

For certain desired angular regions, the number of sub-angular regions required to fill the region can be very large (for example, greater than ten thousand) which requires a very large number of micro-wedges. In these instances, the input beam 14 should have a small diameter to illuminate all portions of the tiles 16. By decreasing the size of the individual micro-wedges, the input beam size can be reduced. The size of the wedges 22, 24, 26, 28, 30, 32, 34, 36, 38, 40, 42, 44 preferably should not be so small, however, as to cause the diffraction angle defined by the wedge apertures to become too great.

As shown in FIG. 6, the output surfaces 130 of an optical device 16' may have slight curvatures. The surfaces 130 may be spherical, parabolic or the like. The output surfaces 130 may be separated by tare surfaces and discontinuities 132 similar to the tare surfaces and rectangular facet boundaries shown in FIGS. 2 and 3. The slight curvatures shown in FIG. 6 produce narrow bands of angles instead of single angles. The illustrated curvatures can help to improve the filling of large angular patterns 18 with fewer facets in the optical device 16'. The embodiment shown in FIG. 6 otherwise operates similarly to the embodiment shown in FIGS. 1–3.

FIG. 7 displays an optical device 16" employed in a reflection mode. In this embodiment, the input light 14 is propagated into a micro-wedge array 16". A mirror coating 122 is used on the array output surfaces which reflects the input light 14 to direct beam portions 46', 48' toward the respective portions of the desired pattern 18.

The present invention may also be employed with a phase bias device or an optical lens 140 as shown schematically in FIG. 1. The lens 140 may be separate from the optical device 16 or it may be constructed as an integral part of the optical device 16. The lens 140 may be on either side of the micro-wedges 22, 24, 26, 28, 30, 32, 34, 36, 38, 40, 42, 44. The lens 140 may be used, for example, to perform an optical Fourier-transform operation.

According to yet another aspect of the invention, the facet boundaries 142 (FIG. 2) of each micro-wedge 22, 24, 26, 28, 30, 32, 34, 36, 38, 40, 42, 44 may be randomized to further reduce the effects of discontinuities at the boundaries 142.

Reference has been made to preferred embodiments in describing the invention. However, additions, deletions, substitutions, or other modifications which would fall within the scope of the invention defined in the claims may be implemented by those skilled in the art without departing from the spirit or scope of the invention. Accordingly, the invention is not to be considered as limited by the foregoing description, but is only limited by the scope of the appended claims.

What is claimed is:

1. A method of making an optical device, said method comprising the steps of:

dividing an angular pattern into a plurality of sub-angular regions;

determining micro-wedge configurations for directing light to said sub-angular regions; and subsequently, generating an array of micro-wedges according to said micro-wedge configurations, such that adjacent micro-wedges in said array have different configurations.

2. The method of claim 1, wherein the two-dimensional arrangement of said micro-wedges in said array is essentially random with respect to the two-dimensional arrangement of said sub-angular regions of said pattern.

3. The method of claim 2, further comprising the step of assigning said micro-wedge configurations to random locations in said array.

4. The method of claim 3, wherein said determining step includes the step of calculating output surface slopes for said micro-wedges.

5. The method of claim 4, wherein said step of generating said array includes the step of forming phase tare surfaces in said micro-wedges.

6. The method of claim 5, wherein said generating step includes the step of forming output surfaces for said micro-wedges.

7. The method of claim 1, further comprising the step of providing a plurality of tiles of said micro-wedge arrays.

* * * * *